United States Patent [19]

Stucki

[11] 3,712,142

[45] Jan. 23, 1973

[54] MAGNETIC AND PRESSURE TRANSDUCER

[75] Inventor: Frank F. Stucki, Portola Valley, Calif.

[73] Assignee: The United States of America as represented by the Secretary of the Air Force

[22] Filed: Nov. 17, 1971

[21] Appl. No.: 199,488

[52] U.S. Cl. .................................. 73/389, 102/18
[51] Int. Cl. ...................... G01l 9/06, G01d 7/04
[58] Field of Search ........... 73/389, 141; 324/34, 47; 102/18, 19.2

[56] References Cited

UNITED STATES PATENTS

| 3,094,929 | 6/1963 | McGinley et al. | 102/18 |
| 3,125,953 | 3/1964 | Foerster | 102/19.2 |

*Primary Examiner*—James J. Gill
*Attorney*—Harry A. Herbert, Jr. et al.

[57] ABSTRACT

A combined magnetometer/pressure transducer in which a pressure transducer structure is wrapped into two perpendicular windings of a magnetometer to provide a multi-sensor head allowing detection of magnetic anomalies and pressure signals simultaneously.

2 Claims, 2 Drawing Figures

PATENTED JAN 23 1973 3,712,142

MAGNETIC AND PRESSURE TRANSDUCER

BACKGROUND OF THE INVENTION

This invention relates to transducers, and more particularly to transducers for measurement of magnetic fields and pressure combined.

In the prior art, there exists individual sensing devices such as magnetometers and pressure transducers. However, there are many utilizations which require both the sensing of magnetic fields and also pressure. The present invention provides a single multi-sensing head permitting the efficient use of different sensing devices and materials and their combination into one structure leads to a more efficient sensor providing multiple outputs.

SUMMARY OF THE INVENTION

A combined magnetometer/pressure transducer is provided in which a piezoelectric pressure-sensitive material is used as a substrate for a thin permalloy film of the magnetometer. A metallic backplate is utilized for the piezoelectric pressure-sensitive material. The combination of permalloy film, piezoelectric material, and metallic backplate is wrapped into two perpendicular windings of the magnetometer to form a multi-sensor head. Amplification and signal detection allow detection of magnetic anomalies and pressure signals from the multiple sensor head.

The object of this invention is to provide a transducer for the combined measurement of magnetic fields and pressure.

Another object of the invention is to provide a combined magnetometer/pressure transducer.

Yet another object of this invention is to provide a combined magnetometer/pressure transducer in which a piezoelectric pressure-sensitive material is used as a substrate for the thin permalloy film of the magnetometer.

These and other objects, features and advantages of the invention will become more apparent from the following description taken in connection with the illustrated embodiment in the accompanying drawings.

DETAILED DESCRIPTION OF THE PREFERRED EMBODIMENT

Figure 1:
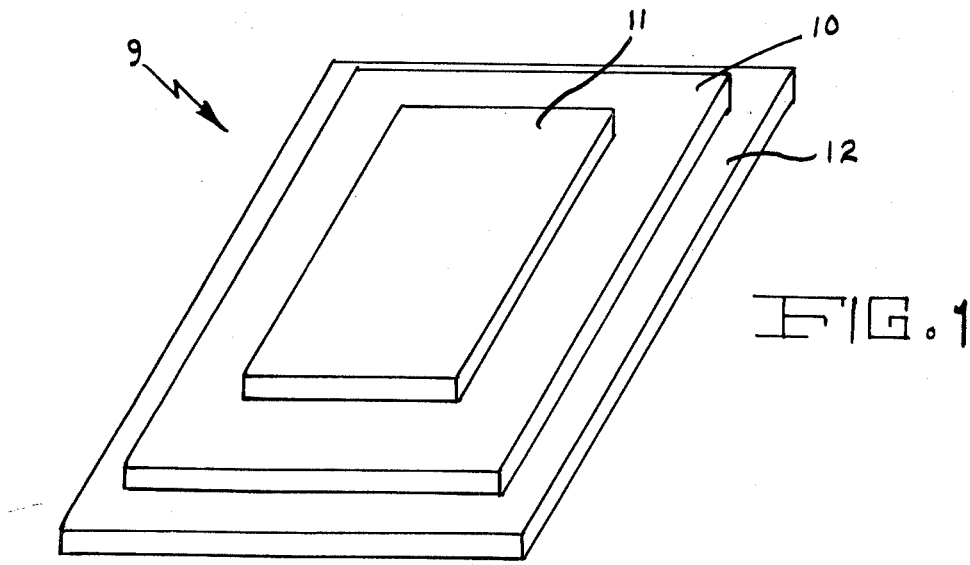
FIG. 1 illustrates the pressure transducer structure of the invention.

Now referring in detail to FIG. 1, there is shown pressure transducer structure 9 wherein piezoelectric pressure-sensitive material 10 is used as substrate for thin permalloy film 11, thin permalloy film 11 serving as part of a magnetometer hereinafter to be described. There is also provided metallic back plate 12. It is noted that the thicknesses of permalloy film 11, piezoelectric pressure-material 12, and metallic backplate 12 are exaggerated for purposes of clarity. Piezoelectric material 10 is of the conventional type and as crystal responsive to pressure to provide a representative electrical signal.

Figure 2:
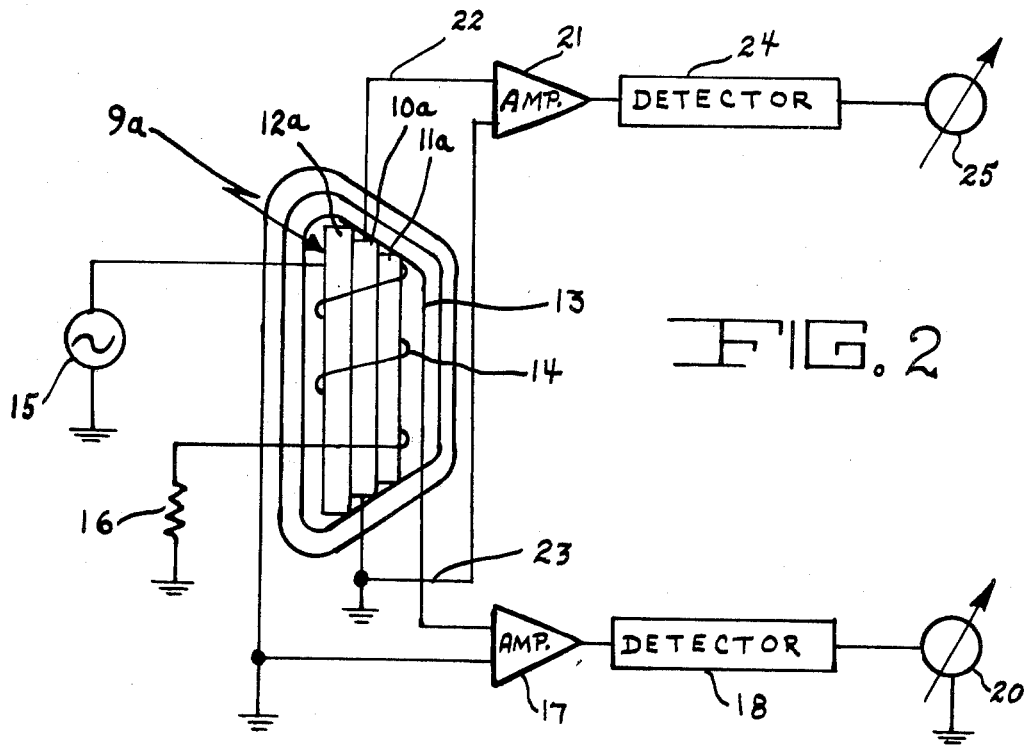
FIG. 2 shows partly in block and partly in schematic form the preferred embodiment of the invention.

Now referring to FIG. 2, pressure transducer structure 9 of FIG. 1 is illustrated in 9a in combination with the requisite circuitry for realizing the combined magnetometer/pressure transducer of this invention. Pressure transducer structure 9a is wrapped into two perpendicular windings 13 and 14. An alternative source of energy at a predetermined frequency is supplied by a generator 15 to one end of winding 14. The other end of winding 14 is grounded by way of resistor 16. The magnetometer portion of the present invention is of the saturable-core type and is comprised of generator 15, permalloy film 11a, and windings 13, 14. The output signal from the magnetometer is provided by winding 13 and is fed to detector 18 by way of amplifier 17. The magnetometer amplified detected signal is then fed to measurement and display device 20 which may be a voltmeter or any other properly calibrated conventional device. The magnetic anomalies are thus indicated and measured by measurement display device 20.

The portion of the present invention that permits pressure sensing is integrated with the magnetometer and is comprised of metallic backplate 12a and piezoelectric pressure-sensitive material 10a. Piezoelectric material 10a may be a piezoelectric crystal that is pressure sensitive. Piezoelectric pressure-sensitive material 10a is connected to amplifier 21 by way of electrical leads 22, 23. The output signal from amplifier 21 is fed to detector 24 and then to measurement and display device 25 to provide a measurement and display of pressure signals. Measurement and display devices 20 and 25 are similar.

It is emphasized that the present invention provides a pressure transducer in which a multi-sensor head is wrapped into two perpendicular windings mounted upon a pressure transducer structure to comprise an integrated sensor. The multisensor head may, for example, be placed in a mine system or detection system which requires both detection of magnetic anomalies and also pressure changes. It is also noted that the multi-sensor head is also capable of detecting, in addition to changes in pressure, ultrasonic variations.

It is claimed:

1. A combined magnetic and pressure transducer comprising a thin permalloy film, a pressure-sensitive piezoelectric material serving as a substrate for said thin permalloy film, first and second electrical conductors connected to said pressure-sensitive piezoelectric material, a metallic backplate for said pressure sensitive material, said thin permalloy film, said pressure-sensitive piezoelectric material and said metallic backplate being integrated into a single structure, first and second windings perpendicular to each other and wrapped around said single structure to form a multi-sensing head to be positioned in a preselected area for detection of magnetic anomalies and pressure changes, said first and second windings, each having first and second ends, generator means providing an alternating source of energy to said first end of said first winding, resistor means connecting said second end of said first winding to ground, first means connected to said first and second end of said second winding to amplify the output signal representative of said magnetic anomalies, second means connected to said first and second electrical connections to amplify the output signal representative of said pressure changes, and first and second detector means receiving the amplified signals from said first and second amplifiers, respectively.

2. A combined magnetic and pressure transducer as described in claim 1 further including first measurement and display means receiving a signal from said first detector means, and second measurement and display means receiving a signal from said second detector means.

* * * * *